(12) United States Patent
Lim et al.

(10) Patent No.: US 8,968,922 B2
(45) Date of Patent: Mar. 3, 2015

(54) RECHARGEABLE LITHIUM BATTERY

(75) Inventors: Jin-Hyunk Lim, Yongin-si (KR);
Ho-Seok Yang, Yongin-si (KR);
Man-Seok Han, Yongin-si (KR);
Mi-Hyeun Oh, Yongin-si (KR)

(73) Assignee: Samsung SDI Co., Ltd (KR)

( * ) Notice: Subject to any disclaimer, the term of this patent is extended or adjusted under 35 U.S.C. 154(b) by 361 days.

(21) Appl. No.: 13/348,382

(22) Filed: Jan. 11, 2012

(65) Prior Publication Data
US 2012/0288771 A1 Nov. 15, 2012

(30) Foreign Application Priority Data

May 13, 2011 (KR) ........................ 10-2011-0045338

(51) Int. Cl.
*H01M 6/04* (2006.01)
*H01M 6/16* (2006.01)
*H01M 4/131* (2010.01)
*H01M 4/36* (2006.01)
*H01M 4/505* (2010.01)
*H01M 4/525* (2010.01)
*H01M 10/052* (2010.01)
*H01M 10/0567* (2010.01)

(52) U.S. Cl.
CPC .............. *H01M 4/131* (2013.01); *H01M 4/362* (2013.01); *H01M 4/505* (2013.01); *H01M 4/525* (2013.01); *H01M 10/052* (2013.01); *H01M 10/0567* (2013.01); *H01M 2300/004* (2013.01); *Y02E 60/122* (2013.01)
USPC .......................................... 429/199; 429/338

(58) Field of Classification Search
USPC ......... 429/207, 323, 324, 326, 338, 199, 223, 429/224, 231.1, 231.95
See application file for complete search history.

(56) References Cited

U.S. PATENT DOCUMENTS

| | | | |
|---|---|---|---|
| 8,349,499 B2 * | 1/2013 | Oh et al. | ........................ 429/326 |
| 2005/0214646 A1 * | 9/2005 | Kubota | ..................... 429/231.95 |
| 2007/0072059 A1 * | 3/2007 | Kitao et al. | ..................... 429/50 |
| 2007/0072085 A1 * | 3/2007 | Chen et al. | ..................... 429/324 |
| 2008/0118843 A1 * | 5/2008 | Tarnopolsky | ................. 429/332 |
| 2008/0138715 A1 | 6/2008 | Ihara et al. | |
| 2008/0152998 A1 | 6/2008 | Murakami et al. | |
| 2009/0098456 A1 | 4/2009 | Park et al. | |
| 2010/0183926 A1 | 7/2010 | Kim et al. | |
| 2010/0255356 A1 * | 10/2010 | Fujii et al. | ........................ 429/94 |

FOREIGN PATENT DOCUMENTS

| | | |
|---|---|---|
| KR | 10-2008-0034400 A | 4/2008 |
| KR | 10-2008-0052421 A | 6/2008 |
| KR | 10-2010-0086370 A | 7/2010 |

OTHER PUBLICATIONS

Korean Notice of Allowance dated Dec. 24, 2012 for Korean Patent Application No. KR 10-2011-0045338 which corresponds to captioned U.S. Appl. No. 13/348,382.

* cited by examiner

*Primary Examiner* — Muhammad Siddiquee
(74) *Attorney, Agent, or Firm* — Knobbe, Martens, Olson & Bear LLP

(57) ABSTRACT

In one aspect, a rechargeable lithium battery including a positive electrode having a positive active material, a negative electrode having a negative active material, and an electrolyte is provided. The positive active material can include manganese-based oxide, and the electrolyte can include fluoroethylene carbonate, lithium bis(oxalato)borate, and tris(trialkylsilyl)borate.

14 Claims, 3 Drawing Sheets

RECHARGEABLE LITHIUM BATTERY

CROSS-REFERENCE TO RELATED APPLICATIONS

This application claims priority to and the benefit of Korean Patent Application No. 10-2011-0045338 filed on May 13, 2011 in the Korean Intellectual Property Office, the disclosure of which is incorporated herein in its entirety by reference.

BACKGROUND

1. Field

This disclosure relates to a rechargeable lithium battery.

2. Description of the Related Technology

Lithium rechargeable batteries using an organic electrolyte solution have twice or more the discharge voltage than that of a conventional battery using an alkali aqueous solution, and accordingly have high energy density.

This rechargeable lithium battery operates by injecting an electrolyte into a battery cell including a positive electrode having a positive active material that can intercalate and deintercalate lithium and a negative electrode having a negative active material that can intercalate and deintercalate lithium.

The resulting rechargeable lithium battery can be used for a mobile phone, an electric pocketbook, a watch, and the like. The positive active material of the rechargeable lithium battery may include lithium metal oxide and the like, while the negative active material may include metal lithium and the like. The electrolyte of the rechargeable lithium battery may be prepared by dissolving a lithium salt in an organic solvent.

Recently, a rechargeable lithium battery including a manganese-based active material has been contemplated for devices requiring high output such as an electric tool and the like. However, the rechargeable lithium battery including manganese-based active material may have a problem of increasing resistance during storage at an elevated temperature.

SUMMARY

One embodiment of this disclosure provides a rechargeable lithium battery having decreased resistance when stored at an elevated temperature and excellent stability at an elevated temperature.

Another embodiment of this disclosure provides a rechargeable lithium battery including a positive electrode having a positive active material; a negative electrode having a negative active material; and an electrolyte having an organic solvent, a lithium salt, and an additive. The positive active material may include manganese-based oxide, and the additive may include fluoroethylene carbonate, lithium bis(oxalato)borate, and tris(trialkylsilyl)borate.

The additive may include 1 to 20 parts by weight of the fluoroethylene carbonate; 0.5 to 5 parts by weight of the lithium bis(oxalato)borate; and 0.5 to 3 parts by weight of the tris(trialkylsilyl)borate based on 100 parts by weight of the sum of the organic solvent and the lithium salt.

The sum of the parts by weight of the lithium bis(oxalato)borate and the tris(trialkylsilyl)borate may be less than the amount of the parts by weight of fluoroethylene carbonate.

The manganese-based oxide may include a compound represented by the following Chemical Formula 4.

$Li_aMn_bO_4$      [Chemical Formula 4]

In Chemical Formula 4, $0.5 \leq a \leq 1.5$, and $1 \leq b \leq 3$.

The positive active material may further include nickel-based oxide. The nickel-based oxide may include a compound represented by the following Chemical Formula 5, a compound represented by the following Chemical Formula 6, or a combination thereof.

$Li_cNi_dCo_eMn_fO_2$      [Chemical Formula 5]

In Chemical Formula 5, $0.5 \leq c \leq 1.5$, $0.1 \leq d \leq 0.6$, $0.1 \leq e \leq 0.5$, and $0.1 \leq f \leq 0.5$.

$Li_gNi_hCo_iAl_jO_2$      [Chemical Formula 6]

In Chemical Formula 6, $0.5 \leq g \leq 1.5$, $0.7 \leq h \leq 0.9$, $0.1 \leq i \leq 0.2$, and $0.01 \leq j \leq 0.10$.

The positive active material may include 70 to 90 wt % of the manganese-based oxide and 10 to 30 wt % of the nickel-based oxide.

Hereinafter, further embodiments will be described in the detailed description.

The present embodiments may provide a rechargeable lithium battery having excellent stability when stored at an elevated temperature due to resistance decrease.

DETAILED DESCRIPTION

Exemplary embodiments will hereinafter be described in detail. However, these embodiments are only exemplary, and this disclosure is not limited thereto.

Figure 1:
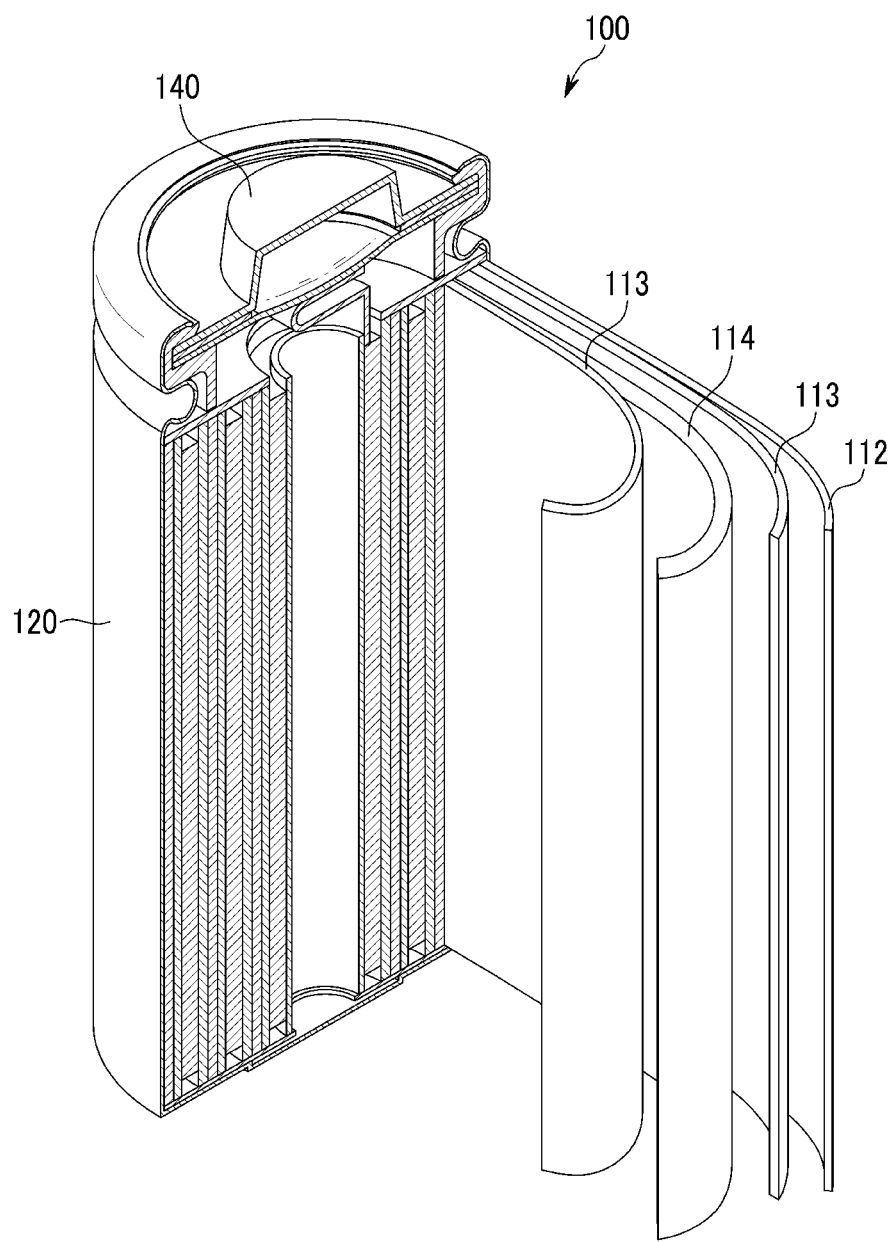
FIG. 1 is a schematic view showing a rechargeable lithium battery according to one embodiment.

The rechargeable lithium battery according to one embodiment is described referring to FIG. 1.

FIG. 1 is a schematic view showing a rechargeable lithium battery according to one embodiment.

FIG. 1 illustrates a rechargeable lithium battery 100, which includes a negative electrode 112, a positive electrode 114, a separator 113 interposed between the negative electrode 112 and the positive electrode 114, an electrolyte (not shown) impregnating the separator 113, a battery case 120, and a sealing member 140 sealing the battery case 120.

In some embodiments, the electrolyte includes an organic solvent, a lithium salt, and an additive. According to one embodiment of the present disclosure, an additive can be added to the non-aqueous organic solvent with the lithium salt dissolved therein. A rechargeable lithium battery including an additive, for example, a rechargeable lithium battery including manganese-based oxide in a positive electrode may have decreased resistance during the storage at an elevated temperature and thus, improved storage characteristics at an elevated temperature.

In some embodiments, the additive may include one or more components selected from the group consisting of fluoroethylene carbonate, lithium bis(oxalato)borate, and tris(trialkylsilyl)borate.

In some embodiments, the fluoroethylene carbonate may be represented by the following Chemical Formula 1.

[Chemical Formula 1]

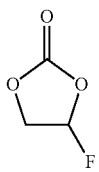

In some embodiments, the fluoroethylene carbonate with the lithium bis(oxalato)borate and the tris(trialkylsilyl)borate can be added to an electrolyte forming a coating layer on the surface of a negative electrode and thus, decreases resistance, improving charge and discharge efficiency at an elevated temperature and accordingly, storability at an elevated temperature.

In some embodiments, the fluoroethylene carbonate may be included in an amount of about 1 to 20 parts by weight. In some embodiments, the fluoroethylene carbonate may be included in an amount of 1 to 10 parts by weight, or in an amount of 3 to 5 parts by weight based on 100 parts by weight of the sum of the organic solvent and the lithium salt. In some embodiments, the fluoroethylene carbonate can be included within the range of 1 to 10 parts by weight. A rechargeable lithium battery, including fluoroethylene carbonate, for example, a rechargeable lithium battery including manganese-based oxide in a positive electrode, may have decreased resistance during the storage at an elevated temperature and thus, improved stability at an elevated temperature.

The lithium bis(oxalato)borate may be represented by the following Chemical Formula 2.

[Chemical Formula 2]

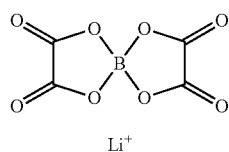

In some embodiments, the lithium bis(oxalato)borate with the fluoroethylene carbonate and the tris(trialkylsilyl)borate can be added to an electrolyte forming a coating layer on the surface of a positive electrode and thus, stabilizes the surface and decreases resistance thereon. As a result, the electrolyte may improve charge and discharge efficiency at an elevated temperature and thus, storability at an elevated temperature.

In some embodiments, the lithium bis(oxalato)borate may be included in an amount of about 0.5 to 5 parts by weight. In some embodiments, the lithium bis(oxalato)borate may be included in an amount of 0.5 to 4 parts by weight, 0.5 to 2 parts by weight, or 0.5 to 1 parts by weight based on 100 parts by weight of the sum of the organic solvent and the lithium salt. In some embodiments, the lithium bis(oxalato)borate can be included within the range of from about 0.5 to 5 parts by weight. In some embodiments, a rechargeable lithium battery, for example, a rechargeable lithium battery including manganese-based oxide in a positive electrode, may have decreased resistance during the storage at an elevated temperature and thus, improved stability at an elevated temperature.

In some embodiments, the tris(trialkylsilyl)borate may be represented by the following Chemical Formula 3.

[Chemical Formula 3]

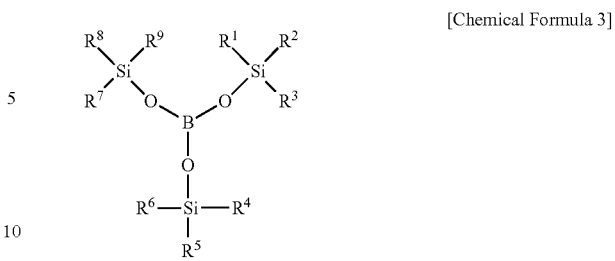

wherein,
$R^1$ to $R^9$ are each a substituted or unsubstituted $C_1$ to $C_5$ alkyl group.

In some embodiments, the $R^1$ to $R^9$ in the above Chemical Formula 3 may be methyl.

In some embodiments, the tris(trialkylsilyl)borate with the fluoroethylene carbonate and the lithium bis(oxalato)borate can be added to an electrolyte forming a coating layer on the surface of a positive electrode and thus, stabilizes the surface and decrease resistance thereon. The electrolyte may improve charge and discharge efficiency at an elevated temperature and thus, storability at an elevated temperature.

In some embodiments, the tris(trialkylsilyl)borate may be included in an amount of 0.5 to 3 parts by weight. In some embodiments, the tris(trialkylsilyl)borate may be included in an amount of 0.5 to 2 parts by weight, or 0.5 to 1 parts by weight based on the 100 parts by weight of the sum of the organic solvent and the lithium salt. In some embodiments, the tris(trialkylsilyl)borate can be included in an amount of 0.5 to 3 parts by weight in a rechargeable lithium battery, for example, a rechargeable lithium battery including manganese-based oxide in a positive electrode, may have decreased resistance at an elevated temperature and thus, improved storage characteristics at an elevated temperature.

In some embodiments, the fluoroethylene carbonate, the lithium bis(oxalato)borate, and the tris(trialkylsilyl)borate can be used together to form a coating layer. The coating layer may further decrease resistance and improve stability at an elevated temperature compared with when they are independently used or as a combination of only two.

In some embodiments, the sum of the lithium bis(oxalato)borate and the tris(trialkylsilyl)borate may be less included than the amount of the fluoroethylene carbonate. In some embodiments, the three additives can have a ratio relationship affording a rechargeable lithium battery having decreased resistance at an elevated temperature and thus, improved storage characteristics at an elevated temperature.

In some embodiments, the organic solvent can serve as a medium for transmitting ions taking part in the electrochemical reaction of the battery. In some embodiments, the organic solvent may include a carbonate, ester, ether, ketone, or alcohol moiety. In some embodiments, the organic solvent may be an aprotic organic solvent.

Examples of an organic solvent including a carbonate moiety include, but are not limited to, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), and the like; a cyclic carbonate compound such as ethylene carbonate (EC), propylene carbonate (PC), butylene carbonate (BC), and the like.

The dielectric constant can increase and the viscosity can decrease when the organic solvent includes a linear carbonate compound and a cyclic carbonate compound. In some embodiments, the cyclic carbonate compound and linear carbonate compound can be mixed together in a volume ratio of about 1:1 to about 1:9.

Examples of an organic solvent including an ester moiety include, but are not limited to, methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of an organic solvent including an ether moiety include, but are not limited to, dibutylether, tetraglyme, diglyme, dimethoxyethane, 2-methyltetrahydrofuran, tetrahydrofuran, and the like. Examples of an organic solvent including a ketone moiety include, but are not limited to, cyclohexanone and the like. Examples of an organic solvent including an alcohol moiety include, but are not limited to, ethyl alcohol, isopropyl alcohol, and the like.

In some embodiments, the organic solvent may be used singularly or in a mixture.

The lithium salt supplies lithium ions in the battery, and performs a basic operation of a rechargeable lithium battery and improves lithium ion transport between positive and negative electrodes.

Examples of the lithium salt include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(SO_2C_xF_{2x+1})(SO_2C_yF_{2y+1})$ (where x and y are natural numbers), LiCl, LiI, or a combination thereof.

In some embodiments, the lithium salt may be used at a concentration ranging from about 0.1 to about 2.0M. Electrolyte performance and lithium ion mobility may be enhanced due to optimal electrolyte conductivity and viscosity when the lithium salt a concentration ranging from about 0.1 to about 2.0M.

In some embodiments, the positive electrode 114 can include a current collector and a positive active material layer disposed on the current collector. In some embodiments, the positive active material layer can include a positive active material, a binder, and optionally a conductive material.

In some embodiments, the current collector may be aluminum (Al), but is not limited thereto.

In one embodiment, the positive active material may be manganese-based oxide.

The manganese-based oxide may be a compound represented by the following Chemical Formula 4.

$$Li_aMn_bO_2 \quad \text{[Chemical Formula 4]}$$

In Chemical Formula 4, 0.5≤a≤1.5, and 1≤b≤3.

In some embodiments, the rechargeable lithium battery including the manganese-based oxide may be used for an electric tool and the like requiring high power. The manganese-based oxide can increase resistance during storage at an elevated temperature.

In some embodiments, fluoroethylene carbonate, lithium bis(oxalato)borate, and tris(trialkylsilyl)borate can be included in an electrolyte. In some embodiments, the inclusion of fluoroethylene carbonate, lithium bis(oxalato)borate, and tris(trialkylsilyl)borate may prevent resistance increase of a rechargeable lithium battery including manganese-based oxide when stored at an elevated temperature and thus, improve stability of the rechargeable lithium battery at an elevated temperature.

In some embodiments, the positive active material may include nickel-based oxide along with the manganese-based oxide.

In some embodiments, the nickel-based oxide may include a compound represented by the following Chemical Formula 5, a compound represented by the following Chemical Formula 6, or a combination thereof.

$$Li_cNi_dCo_eMn_fO_2 \quad \text{[Chemical Formula 5]}$$

In Chemical Formula 5, 0.5≤c≤1.5, 0.1≤d≤0.6, 0.1≤e≤0.5, and 0.1≤f≤0.5.

$$Li_gNi_hCo_iAl_jO_2 \quad \text{[Chemical Formula 6]}$$

In Chemical Formula 6, 0.5≤g≤1.5, 0.7≤h≤0.9, 0.1≤i≤0.2, and 0.01≤j≤0.10.

In some embodiments, 70 to 90 wt % of the manganese-based oxide may be mixed with 10 to 30 wt % of the nickel-based oxide. In some embodiments, 80 to 90 wt % of the manganese-based oxide may be mixed with 10 to 20 wt % of the nickel-based oxide. In some embodiments, the manganese-based oxide can be used to afford a rechargeable lithium battery with excellent storability at an elevated temperature due to resistance decrease when allowed to stand at an elevated temperature.

In some embodiments, the binder can improve binding properties of the positive active material particles to each other and to a current collector. Examples of the binder include, but are not limited to, at least one component selected from the group consisting of polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

In some embodiments, the conductive material can be used in order to improve conductivity of an electrode. Any electrically conductive material may be used as a conductive material unless it causes a chemical change. Examples of the conductive material include, but are not limited to, natural graphite, artificial graphite, carbon black, acetylene black, ketjen black, a carbon fiber, a metal powder or a metal fiber including copper, nickel, aluminum, silver, and so on, and a polyphenylene derivative.

In some embodiments, the negative electrode 112 includes a negative current collector and a negative active material layer disposed on the negative current collector.

In some embodiments, the current collector may include a copper foil.

In some embodiments, the negative active material layer includes a negative active material, a binder, and optionally a conductive material.

In some embodiments, the negative active material includes a material that reversibly intercalates/deintercalates lithium ions, a lithium metal, a lithium metal alloy, a material being capable of doping and dedoping lithium, or a transition metal oxide.

In some embodiments, the material that reversibly intercalates/deintercalates lithium ions can include a carbon material. In some embodiments, the carbon material may be any generally-used carbon-based negative active material in a lithium ion rechargeable battery. Examples of the carbon material include, but are not limited to, crystalline carbon, amorphous carbon, and mixtures thereof. In some embodiments, the crystalline carbon may be irregularly-shaped, or may be sheet, flake, spherical, or fiber shaped natural graphite or artificial graphite. In some embodiments, the amorphous carbon may be a soft carbon, a hard carbon, mesophase pitch carbonized product, fired coke, and the like.

In some embodiments, the lithium metal alloy can include lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material being capable of doping and dedoping lithium include Si, $SiO_x$ (0<x<2), a Si—Y alloy (where Y is an element selected from the group consisting of an alkali metal, an alkali-earth metal, group 13 to 16 elements, a transition element, a rare earth element, and combinations thereof, and is not Si), Sn, $SnO_2$, a Sn—Y alloy (where Y is an element selected from the group consisting of an alkali metal, an alkali-earth metal, group 13 to 16 elements, a transition element, a rare earth element, and combinations thereof and is not Sn), or mixtures thereof. In some embodiments, one or more of these materials may be mixed with $SiO_2$. In some embodiments, Y may include one selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide include vanadium oxide, lithium vanadium oxide, and the like.

In some embodiments, the binder improves binding properties of the negative active material particles to each other and to a current collector. Examples of the binder include but are not limited to, at least one selected from the group consisting of polyvinyl alcohol, carboxylmethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

Any electrically conductive material may be used as a conductive material unless it causes a chemical change. Examples of the conductive material include: carbon-based materials such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; and mixtures thereof.

In some embodiments, the negative electrode 112 and the positive electrode 114 may be manufactured by a method including mixing the active material, a conductive material, and a binder to provide an active material composition, and coating the composition on a current collector.

In some embodiments, the solvent can be N-methylpyrrolidone, but it is not limited thereto.

In some embodiments, the separator 113 may be formed as a single layer or a multilayer, and may be made of polyethylene, polypropylene, polyvinylidene fluoride, or a combination thereof.

Hereinafter, examples of one or more embodiments will be described in more detail including comparative examples. However, these examples are not intended to limit the scope of the one or more embodiments.

In the following examples, if the detailed description of the already known structure and operation may confuse the subject matter of the present disclosure, the detailed description thereof will be omitted.

Fabrication of Rechargeable Lithium Battery Cell

Examples 1 to 4 and Comparative Examples 1 to 12

$LiPF_6$ with a concentration of 1.5M was dissolved in a solution of ethylene carbonate (EC), ethylmethyl carbonate (EMC), and dimethyl carbonate (DMC) in a volume ratio of 2:2:6. Fluoroethylene carbonate (FEC), lithium bis(oxalato) borate (LiBOB), and tris(trimethylsilyl)borate (TMSB) were added thereto as an additive as provided in Table 1, preparing an electrolyte solution.

Next, a positive active material layer composition was prepared by respectively mixing $LiMn_2O_4$ as a positive active material, polyvinylidene fluoride (PVDF) as a binder, and carbon as a conductive material in a weight ratio of 92:4:4 and dispersing the mixture into N-methyl-2-pyrrolidone. The positive active material layer composition was coated on a 20 μm thick aluminum foil and then, dried and compressed, fabricating a positive electrode.

The positive electrode, metal lithium as a counter electrode, and the electrolyte solution were used to fabricate a coin-type half-cell.

Example 5 and Comparative Example 13

A positive active material layer composition was prepared by mixing a positive active material including a mixture of $LiMn_2O_4$ and $LiNi_{0.5}Co_{0.2}Mn_{0.3}O_2$ in a weight ratio of 8:2, polyvinylidene fluoride (PVDF) as a binder, and carbon as a conductive material in a weight ratio of 92:4:4 and dispersing the mixture into N-methyl-2-pyrrolidone. The positive active material layer composition was coated on a 20 μm-thick aluminum foil and then, dried and compressed, fabricating a positive electrode.

A coin-type half-cell was fabricated by using the positive electrode, metal lithium as a counter electrode, and an electrolyte solution prepared in the same amount as provided in Table 1 according to the same method as Example 1.

Comparative Examples 14 and 15

A positive active material layer composition was prepared by mixing $LiCoO_2$ as a positive active material, polyvinylidene fluoride (PVDF), and carbon as a conductive material in a weight ratio of 92:4:4 and dispersing the mixture into N-methyl-2-pyrrolidone. The positive active material layer composition was coated on a 20 μm-thick aluminum foil and then, dried and compressed, affording a positive electrode.

The positive electrode was used with metal lithium as a counter electrode and an electrolyte solution prepared in an amount provided in Table 1 according to the same method as Example 1 to fabricate a half-cell.

Evaluation 1: Resistance of Rechargeable Lithium Battery Cells

The half-cells according to Examples 1 to 5 and Comparative Examples 1 to 15 were measured regarding DC internal resistance (DC-IR) when stored at an elevated temperature. The results are provided in Table 1.

The DC-IR was measured according to the following method.

The half-cells according to Examples 1 to 5 and Comparative Examples 1 to 15 were charged at 4 A and 4.2V at a room temperature of 25° C. and cut-off at 100 mA and then, allowed to stand for 30 minutes. Next, the half-cells were respectively discharged at 10 A for 10 seconds, at 1 A for 10 seconds, and at 10 A for 4 seconds and measured regarding current and voltage at 18 seconds and 23 seconds, respectively and then, calculated regarding initial resistance (a resistance difference between 18 seconds and 23 seconds) according to the $\Delta R = \Delta V / \Delta I$ formula.

In addition, the half-cells according to Examples 1 to 5 and Comparative Examples 1 to 15 were allowed to stand at an elevated temperature of 60° C. for 50 days and measured regarding resistance at the elevated temperature according to the same method as the initial resistance.

DC-IR (mΩ) variation values in Table 1 indicate a difference between initial resistance and resistance at an elevated temperature.

TABLE 1

|  |  | Additive (parts by weight*) | | | DC-IR variation |
|---|---|---|---|---|---|
|  |  | FEC | LiBOB | TMSB | values (mΩ) |
| Example | 1 | 3 | 1 | 0.5 | 117 |
|  | 2 | 3 | 1 | 1 | 119 |
|  | 3 | 3 | 1 | 3 | 125 |
|  | 4 | 3 | 1 | 5 | 126 |
|  | 5 | 3 | 1 | 0.5 | 119 |
| Comparative | 1 | 0 | 0 | 0 | 169 |
| Example | 2 | 1 | 0 | 0 | 160 |
|  | 3 | 3 | 0 | 0 | 140 |
|  | 4 | 5 | 0 | 0 | 142 |
|  | 5 | 7 | 0 | 0 | 145 |
|  | 6 | 3 | 0.5 | 0 | 135 |
|  | 7 | 3 | 1 | 0 | 133 |
|  | 8 | 3 | 3 | 0 | 137 |
|  | 9 | 3 | 5 | 0 | 138 |
|  | 10 | 3 | 0 | 0.5 | 136 |
|  | 11 | 3 | 0 | 1 | 140 |
|  | 12 | 3 | 0 | 3 | 149 |
|  | 13 | 0 | 0 | 0 | 145 |
|  | 14 | 0 | 0 | 0 | 190 |
|  | 15 | 3 | 1 | 0.5 | 187 |

*part by weight: a unit based on 100 parts by weight of the entire weight of an EC/EMC/DMC mixed solution and $LiPF_6$ Referring to Table 1, when the half-cells including manganese-based oxide as a positive active material and fluoroethylene carbonate, lithium bis(oxalato)borate, and tris(trialkylsilyl)borate in an electrolyte solution according to Examples 1 to 5 were allowed to stand at an elevated temperature, they had a lower DC-IR increase rate than ones according to Comparative Examples 1 to 15. Accordingly, the rechargeable lithium battery cells afforded excellent elevated temperature stability.

Evaluation 2: LSV (Linear Sweep Voltammetry) Measurement of Electrolyte Solution The electrolyte solutions according to Example 1 and Comparative Example 1 were analyzed regarding movement using LSV (Linear Sweep Voltammetry). The results are provided in FIG. 2.

The LSV analysis was performed by allowing the electrolyte solutions according to Example 1 and Comparative Example 1 to reside at 60° C. in a chamber for 5 days and measuring them at a voltage ranging from 3V to 7V at a scan speed of 0.1 mV/s. Herein, a platinum electrode was used as a working electrode, while lithium metals were used for a reference electrode and a counter electrode.

Figure 2:
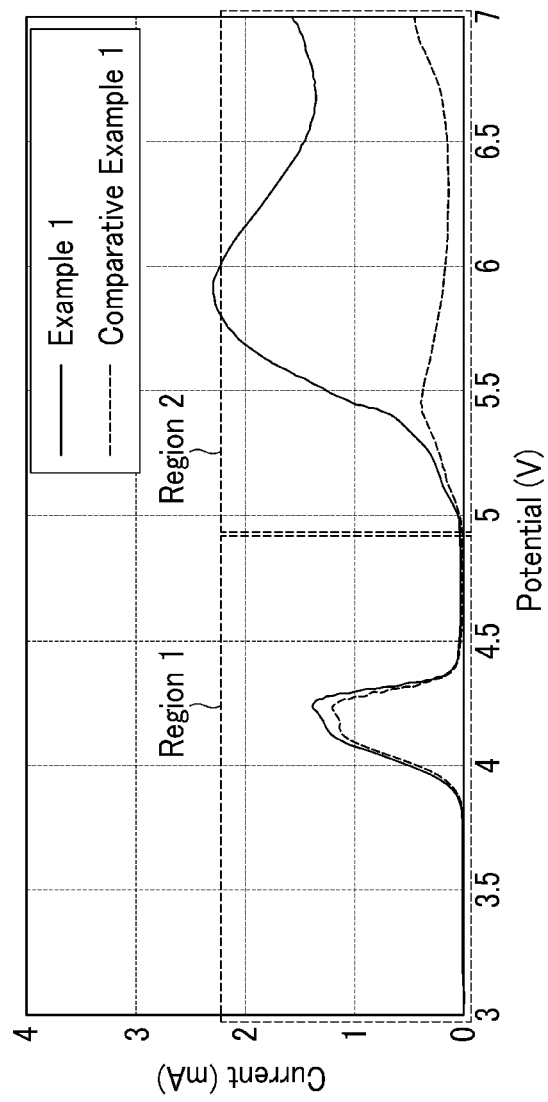
FIG. 2 provides a graph showing LSV (Linear Sweep Voltammetry) of electrolytes according to Example 1 and Comparative Example 1 when allowed to stand at an elevated temperature.

FIG. 2 shows LSV (Linear Sweep Voltammetry) graph of the electrolyte solutions according to Example 1 and Comparative Example 1 when allowed to stand at a elevated temperature. Referring to FIG. 2, the electrolyte solution including fluoroethylene carbonate, lithium bis(oxalato)borate, and tris(trialkylsilyl)borate all according to Example 1 had a higher current peak at a region of 5V or more than the one including no additive according to Comparative Example 1. This results shows that the decomposition of the electrolyte solution including an additive in a region of 5V or more was started, which forms a coating layer on an electrode and decreases resistance. Accordingly, a rechargeable lithium battery cell may afford elevated temperature stability.

Evaluation 3: Resistance of Rechargeable Lithium Battery Cells when Stored at an Elevated Temperature The half-cells according to Example 1 and Comparative Example 1 were measured regarding each impedance when stored at a room temperature and an elevated temperature to evaluate resistance. The results are provided in FIG. 3.

The impedance was measured in the following method.

The half-cells according to Example 1 and Comparative Example 1 were charged with 4 A and 4.2V at a room temperature of 25° C. and cut off at 100 mA to measure initial impedance under a very small excitation amplitude ranging from 5 to 10 mV and a frequency ranging from 1 MHz to 1 mHz.

In addition, the half-cells according to Example 1 and Comparative Example 1 were held at an elevated temperature of 70° C. for 20 days and then, measured regarding impedance at an elevated temperature according to the same method as above.

Figure 3:
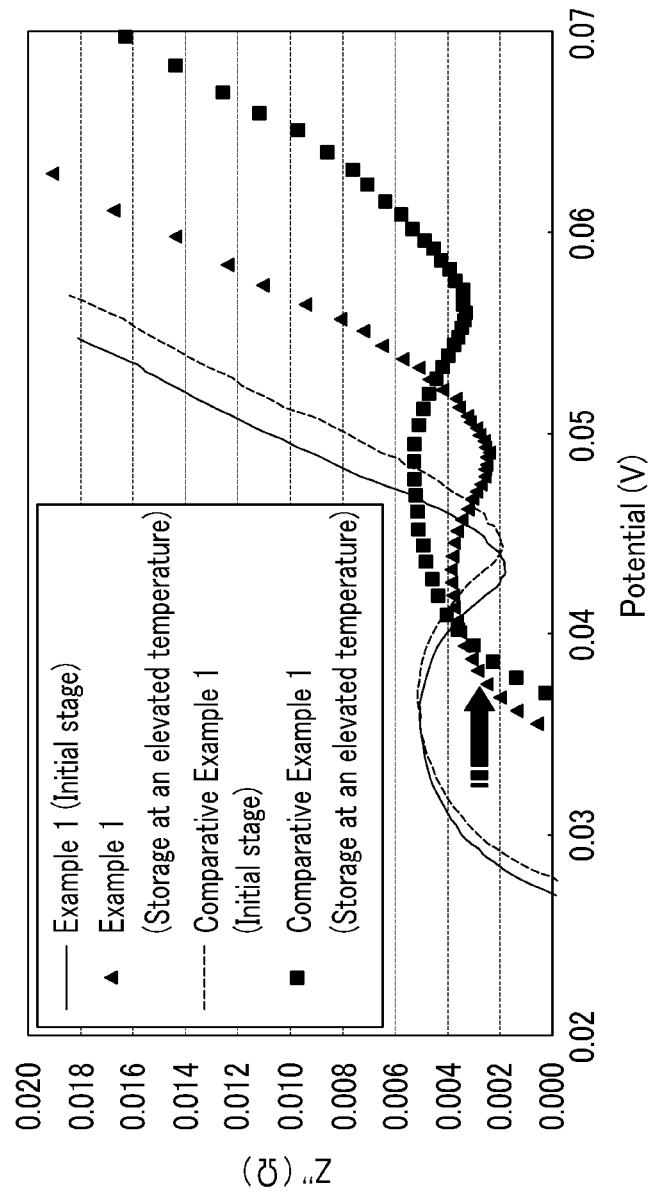
FIG. 3 provides a graph showing initial impedance of each rechargeable lithium battery of Example 1 and Comparative Example 1 and its impedance when allowed to stand at an elevated temperature.

FIG. 3 provides a graph showing initial impedance of the rechargeable lithium battery cells according to Example 1 and Comparative Example 1 and their impedance when allowed to stand at an elevated temperature. In FIG. 3, $Z'(\Omega)$ of a horizontal axis indicates a real impedance, while $Z''(\Omega)$ in a vertical axis indicates an imaginary impedance.

Referring to FIG. 3, the half-cell of Example 1 has a smaller semicircle of impedance when allowed to stand at an elevated temperature against its initial impedance. On the other hand, the half-cell of Comparative Example 1 has a bigger semicircle of impedance when allowed to stand at an elevated temperature against its initial impedance. According to one embodiment of the present invention, a rechargeable lithium battery cell may have decreased resistance and accomplish excellent stability at an elevated temperature.

While the present embodiments have been described in connection with what is presently considered to be practical exemplary embodiments, it is to be understood that the invention is not limited to the disclosed embodiments and is intended to cover various modifications and equivalent arrangements included within the spirit and scope of the appended claims.

What is claimed is:

1. A rechargeable lithium battery comprising
a positive electrode including a positive active material, wherein the positive active material comprises $Li_aM-n_bO_4$ where $0.5 \leq a \leq 1.5$, and $1 \leq b \leq 3$;
a negative electrode including a negative active material; and
an electrolyte including an organic solvent, a lithium salt, and an additive, and
the additive comprises fluoroethylene carbonate in an amount of 1 to 20 parts by weight, lithium bis(oxalato)borate in an amount of 0.5 to 5 parts by weight, and a tris(trialkylsilyl)borate in an amount of 0.5 to 3 parts by weight based on 100 parts by weight of the non-aqueous organic solvent and the lithium salt, wherein the sum of the lithium bis(oxalato)borate and the tris(trialkylsilyl)borate by parts by weight is less than the amount of the fluoroethylene carbonate by weight, and wherein the tris(trialkylsilyl)borate is a compound represented by Chemical Formula 3:

[Chemical Formula 3]

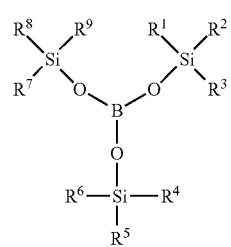

wherein, $R^1$ to $R^9$ are each a substituted or unsubstituted $C_1$ to $C_5$ alkyl group.

2. The rechargeable lithium battery of claim 1, wherein the positive active material further comprises nickel-based oxide.

3. The rechargeable lithium battery of claim 2, wherein the nickel-based oxide comprises a compound represented by the following Chemical Formula 5, a compound represented by the following Chemical Formula 6, or a combination thereof, $$Li_cNi_dCo_eMn_fO_2 \qquad \text{[Chemical Formula 5]}$$

wherein, $0.5 \le c \le 1.5$, $0.1 \le d \le 0.6$, $0.1 \le e \le 0.5$, and $0.1 \le f \le 0.5$ $$Li_gNi_hCo_iAl_jO_2 \qquad \text{[Chemical Formula 6]}$$

wherein, $0.5 \le g \le 1.5$, $0.7 \le h \le 0.9$, $0.1 \le i \le 0.2$, and $0.01 \le j \le 0.10$.

4. The rechargeable lithium battery of claim 2, wherein the positive active material comprises 70 to 90 wt % of the manganese-based oxide and 10 to 30 wt % of the nickel-based oxide.

5. The rechargeable lithium battery of claim 1, wherein the organic solvent comprises a carbonate moiety, ester moiety, ether moiety, ketone moiety, or alcohol moiety.

6. The rechargeable lithium battery of claim 1, wherein the organic solvent comprises an aprotic solvent.

7. The rechargeable lithium battery of claim 1, wherein the lithium salt comprises at least one of $LiPF_6$, $LiBF_4$, $LiSbF_6$, $LiAsF_6$, $LiC_4F_9SO_3$, $LiClO_4$, $LiAlO_2$, $LiAlCl_4$, $LiN(SO_2C_xF_{2x+1})(SO_2C_yF_{2y+1})$ (where x and y are natural numbers), LiCl, LiI, or a combination thereof.

8. The rechargeable lithium battery of claim 7, wherein the lithium salt is $LiPF_6$.

9. The rechargeable lithium battery of claim 1, wherein $R^1$ to $R^9$ is methyl.

10. The rechargeable lithium battery of claim 1, wherein the compound represented by Chemical Formula 4 is $LiMn_2O_4$.

11. The rechargeable lithium battery of claim 3, wherein the compound represented by Chemical Formula 5 is $LiNi_{0.5}Co_{0.2}Mn_{0.3}O_2$.

12. The rechargeable lithium battery of claim 1, wherein the organic solvent comprises one or more components selected from the group consisting of ethylene carbonate (EC), ethylmethyl carbonate (EMC), and dimethyl carbonate (DMC).

13. The rechargeable lithium battery of claim 12, wherein the lithium salt is $LiPF_6$.

14. The rechargeable lithium battery of claim 13, wherein the tris(trialkylsilyl)borate is tris(trimethylsilyl)borate.

\* \* \* \* \*